Dec. 6, 1927.　　　　　　　　　　　　　　　　　　1,651,764
W. A. GIBBONS ET AL
PROCESS AND APPARATUS FOR CONCENTRATING FLUIDS
Filed July 11, 1923　　　2 Sheets-Sheet 1
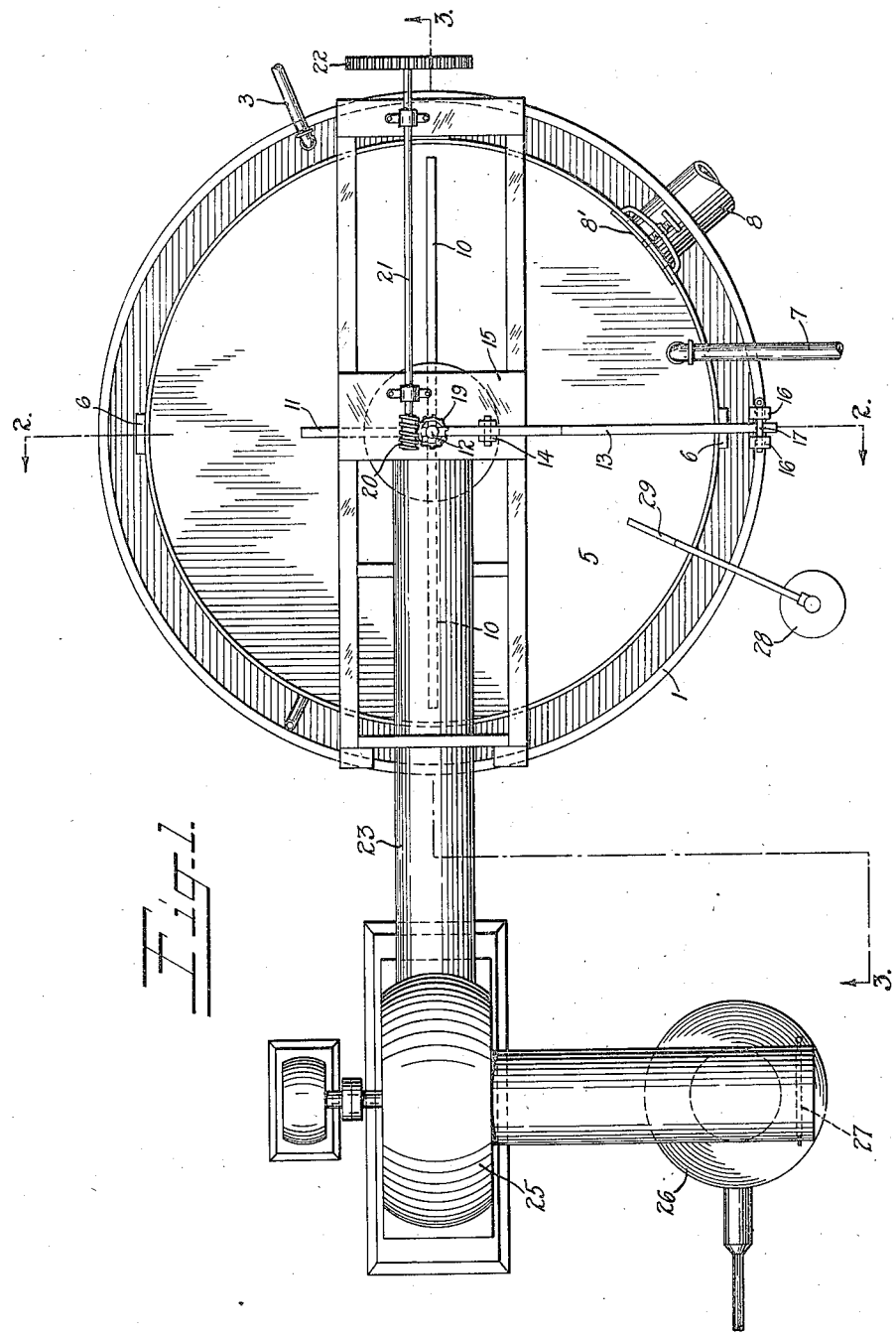
Inventors
WILLIS A. GIBBONS
AND MORRIS G. SHEPARD
By their Attorney

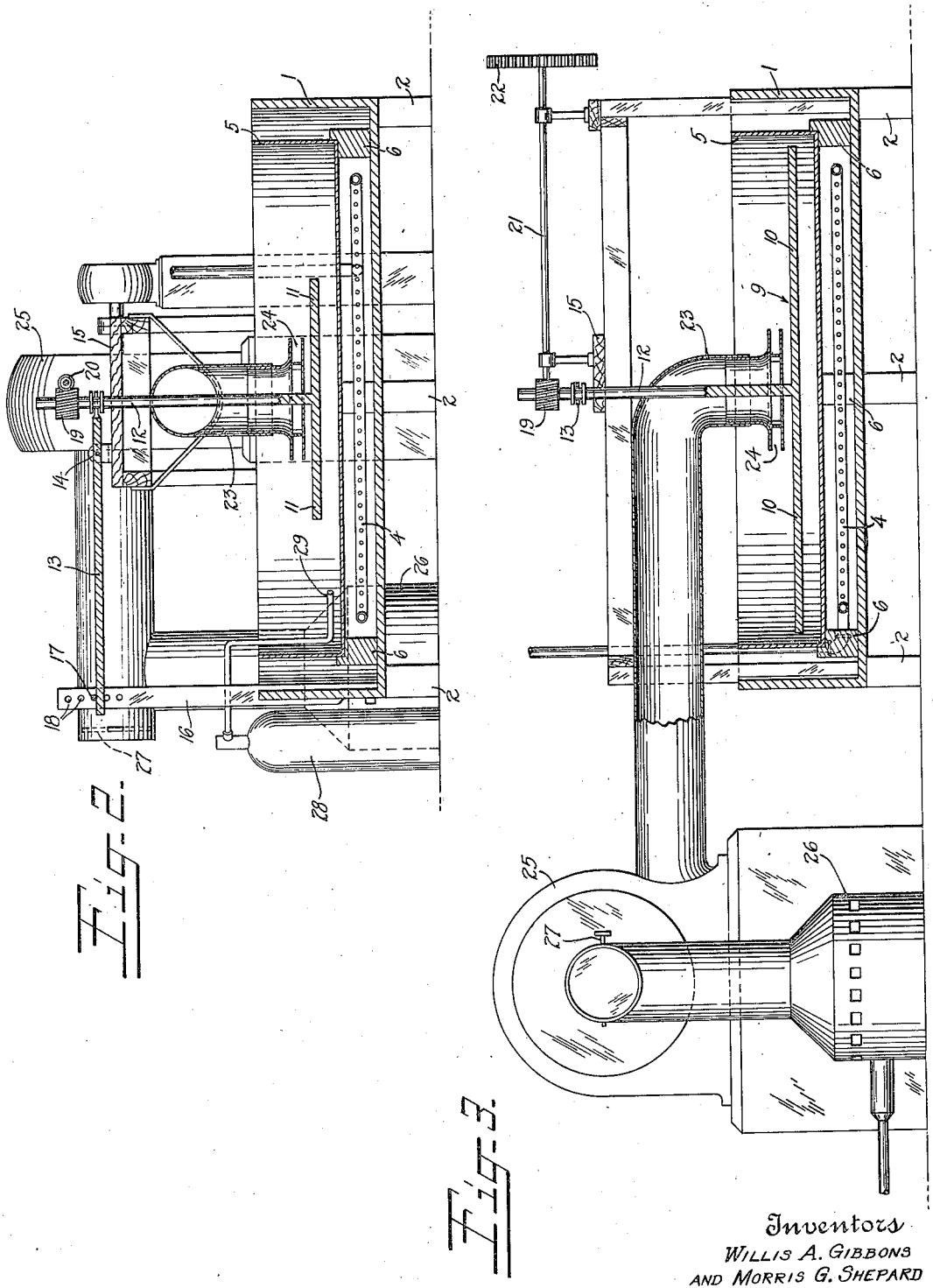

Patented Dec. 6, 1927.

1,651,764

UNITED STATES PATENT OFFICE.

WILLIS A. GIBBONS AND MORRIS G. SHEPARD, OF NEW YORK, N. Y., ASSIGNORS TO GENERAL RUBBER COMPANY, OF NEW YORK, N. Y., A CORPORATION OF NEW JERSEY.

PROCESS AND APPARATUS FOR CONCENTRATING FLUIDS.

Application filed July 11, 1923. Serial No. 650,774.

This invention relates to a process and apparatus for concentrating fluids, more particularly as applied to the concentration of rubber or other latices.

In recent years the direct application of rubber latex for various purposes in the rubber art is becoming more and more common. The latex in its natural condition varies somewhat in its rubber content but 33⅓% may be taken as an average, and latex of this content is about of the consistency of ordinary cream. For many special purposes, however, it is preferable to use latex having a higher rubber content and of a thicker consistency, such as when it is applied in spreading operations or for impregnating. Various processes have been developed for concentrating the latex to the desired rubber content and consistency, in which a vacuum is used, as by steam jacketed vacuum kettles or by drawing the latex in vacuum through heated tubes. These processes are open to a number of objections. Owing to the vacuum, the liquid foams. While the concentration can be quickly and successfully carried by the vacuum to a point around 50% rubber content, attempts to attain higher concentrations frequently cause considerable coagulation of the rubber. It is impossible by these methods to carry the concentration to as high as 70-80%.

An object of our invention is to provide a quick, simple and economical process for concentrating latex.

Another object is to provide a process for concentrating latex to a high degree.

Still another object is to provide a latex concentrating process in which the amount of coagulum formed is relatively low.

A further object is to provide a process of the character described which can be carried out without injurious heating of the latex.

A still further object is to provide a latex concentrating process in which mechanical difficulties such as foaming are avoided.

A still further object is to provide a simple and efficient apparatus for carrying out the process.

The process in its broader aspects consists in withdrawing moisture from a body of latex by the application of a moisture absorbing medium to the surface thereof, and continuously agitating said surface during such application. The latex is also preferably although not necessarily heated during the operation, and the temperature gradually reduced as the concentration reaches a higher degree. The apparatus forming part of the invention consists of a relatively shallow latex pan provided with means for heating the latex when desired, means for passing a heated gas over the surface of the latex, and means for preventing the formation of a film of coagulum on the latex surface.

For a detailed disclosure of the nature and objects of the invention reference is had to the accompanying specification and drawings, in which latter is disclosed an embodiment of an apparatus for carrying out the process, and in which drawings, Fig. 1 is a plan view of the apparatus, Fig. 2 is a vertical section on the line 2—2 of Fig. 1, and Fig. 3 is a vertical section on the line 3—3 of Fig. 1.

Referring to the drawings the numeral 1 designates any suitable form of water jacket, which may be supported by the legs 2, the jacket being provided with a water inlet 3 (Fig. 1), and also with a perforated steam coil 4 adjacent its bottom. Disposed in the water jacket is a relatively shallow latex concentrating pan 5, which is spaced from the bottom of the water jacket by the supports 6. An inlet pipe 7 is provided for supplying the pan with latex, and adjacent the bottom of the pan an outlet 8 governed by the closure 8' is provided for withdrawing the concentrated material. Within the pan 5 there is disposed a rotatable stirrer 9 for agitating the surface of the latex, this stirrer in the present instance being provided with a pair of opposed long arms 10 extending almost to the walls of the pan and with a pair of relatively short arms 11 arranged at right angles to the first pair. The shaft 12 of the stirrer adjacent its upper end is rotatably secured within the end of a lever 13 pivoted at 14 to the frame 15. By operation of this lever the stirrer 9 may be vertically adjusted to vary its position in the pan, and to maintain the lever in adjusted position its outer free end is disposed between a pair of uprights 16 and secured by the pin 17 adapted to be inserted in any one of a series of openings 18 in the uprights 16. At its upper end the shaft 12 is provided with a gear 19 meshing with a worm 20 carried by the shaft 21, at the opposite end of which latter there is secured a gear 22 which may be driven from any suitable source of power. A supply pipe 23 for a heated medium such as air and combustion products extends across the pan and downwardly at a point centrally of the latter, the lower end of the pipe being provided with a flattened radially directed opening 24. At its other end the pipe 23 communicates with a fan casing 25, which latter is connected to any suitable furnace 26. The fan casing also communicates with the atmosphere through an opening controlled by the damper 27, and by this construction a regulated mixture of heated air and combustion products may be supplied to the opening 24. It is obvious that any other suitable inert moisture absorbing medium may be used. Latex is ordinarily preserved against premature coagulation by the addition of a small quantity of ammonia, and as the tendency toward coagulation increases at higher concentrations it is preferable to add more ammonia at this time. An ammonia tank 28 is therefore provided, from which a discharge pipe 29 leads to a point below the surface of the latex in the pan 5 and when necessary ammonia is admitted to the pan, where due to the rotary movement of the latex it is distributed therein and absorbed.

In carrying out the process with the apparatus of the present embodiment steam is turned on in the coil 4 which heats the water bath, latex supplied to the pan 5, air and combustion products or other heated medium supplied through the pipe 23, and the stirrer 9 set in operation. The stirrer 9 is adjusted so that the arms 10 and 11 just scrape the surface of the latex, and the outlet 24 of pipe 23 is so arranged as to discharge the air as close to the surface of the liquid as practicable. As the operation proceeds latex may be added through the pipe 7 from time to time to make up for the moisture evaporated and maintain the surface of the liquid at substantially a constant level, and when the latex has reached the desired concentration the batch may be withdrawn by opening the closure 8'. An important factor in the operation of the process is the temperature at which the latex is maintained. If this is kept elevated for any great length of time considerable coagulation takes place on the bottom and sides of the pan, particularly when the concentration is high. However, it has been found that it is practicable to heat the latex to a fairly high temperature in the early stages of the operation, and at this time the temperature in the water jacket may be maintained as high as 90°. When the concentration of the latex has increased considerably, say to about 60% to 65%, it is desirable to gradually lower the temperature from this point on. In this manner coagulation is reduced to a minimum, even at high concentrations. The air may be supplied at a temperature of from 80 to 90° C., and the quantity of air varied to suit conditions. Under any given set of conditions the rate of evaporation is almost directly proportional to the rate of the flow of air. In evaporating latex coagulation tends to occur at any point where the heat is localized, for instance, on the walls of a heated vessel containing the latex, and for the same reason if the surface of the liquid in the pan 5 were left undisturbed a film of coagulum would tend to form by reason of the passage of the heated air across the surface, but by the provision of the stirrer 9 the formation of this film is prevented. As above stated the stirrer is so adjusted that its arms 10 and 11 will just scrape the surface of the liquid. The speed of rotation of the stirrer is preferably not too high, for instance about 50 revolutions a minute, as if the speed is excessive the latex tends to splash on the sides of the pan and the thin films of latex formed thereby promote coagulation. The arms 10 of the stirrer are comparatively long and hence the linear speed adjacent the outer ends is much greater than near the center, so that due to this fact and the eddying movement a film of coagulum tends to form at the center, but by the provision of the additional short arms 11 this trouble is obviated. The shallow pan presents a larger surface of the latex to the heating gas in proportion to its bulk.

By the use of the process latex may be readily concentrated to 75% rubber content with a very low percentage of coagulum, and it is even possible to obtain a concentration as high as 80% or 82%. In fact the limiting factor does not appear to be coagulation, but mechanical difficulties such as stirring, since latex of 80% concentration is so thick that it will not flow, and partakes more of the nature of a gel than a liquid.

It will be seen that by our invention it is possible to readily and economically concentrate latex to a very high degree without injurious heating of the latex, with the formation of a minimum of coagulum, and without the production of the foaming which is such a serious objection in the vacuum evaporating process, and although particularly adapted for concentrating latex the invention may be used with other fluids.

While specific embodiments of the process and apparatus have been shown and described it is obvious that with the detailed disclosure numerous modifications will suggest themselves to those skilled in the art, and it is not desired to limit the invention otherwise than as set forth in the appended claims.

Having thus described our invention, what we claim and desire to protect by Letters Patent is:—

1. The process of concentrating latex or similar materials, which comprises withdrawing moisture therefrom by passing a heated gas over the surface of the latex, and continuously checking the formation of a film of coagulum at the surface during the operation.

2. The process of concentrating latex or similar materials, which consists in heating the latex, passing a moisture absorbing medium over the surface thereof, and gradually reducing the temperature of the latex as the concentration increases to prevent coagulation.

3. The process of concentrating latex or similar materials, which consists in heating the latex, removing moisture therefrom by passing a heated gas over its surface, and gradually reducing the temperature of the latex as the concentration increases.

4. The process of concentrating latex or similar materials, which consists in heating the latex, removing moisture therefrom by passing a heated gas over its surface, continuously agitating the surface, and gradually reducing the temperature of the latex as the concentration increases.

5. The process of concentrating latex or similar materials, which consists in heating the latex, disposing it in a relatively thin body, removing moisture therefrom by passing a heated gas over its surface, and continuously agitating the surface.

6. The process of concentrating latex or similar materials, which consists in heating the latex, disposing it in a relatively thin body, removing moisture therefrom by passing a heated gas over its surface, continuously agitating the surface, and gradually reducing the temperature of the latex as the concentration increases.

7. The process of concentrating latex or similar materials, which consists in heating the latex, withdrawing moisture therefrom by passing a heated gas over its surface, continuously agitating the surface, maintaining the temperature of the latex substantially constant for a portion of the operation, and thereafter gradually reducing the temperature of the latex as the concentration increases.

8. The process of concentrating latex or similar materials, which consists in heating the latex, withdrawing moisture therefrom by passing a heated gas over its surface, continuously agitating the surface, maintaining the temperature of the latex substantially constant until a concentration of about 60%–65% is reached, and thereafter gradually reducing the temperature of the latex as the concentration increases.

9. In an apparatus for concentrating latex or similar materials, a latex pan, means for discharging a heated gas adjacent the surface of the latex and substantially parallel thereto, and means disposed in the pan for continuously agitating the surface of the latex.

10. In an apparatus for concentrating latex or similar materials, a latex pan, means for discharging a heated gas adjacent the surface of the latex, means disposed in the pan for continuously agitating the surface of the latex, and means whereby said last means may be adjusted in accordance with changes in the level of the latex.

11. In an apparatus for concentrating latex or similar materials, a latex pan, means for radially discharging a heated gas adjacent the surface of the latex, and a rotatable stirring means adapted to contact with the surface of the latex.

12. In an apparatus for concentrating latex or similar materials, a latex pan, means for discharging a heated gas adjacent the surface of the latex and substantially parallel thereto, and a plurality of horizontally directed rotatable arms disposed in the pan and adapted to contact with the surface of the latex.

13. In an apparatus for concentrating latex or similar materials, a latex pan, means for discharging a heated gas adjacent the surface of the latex, a plurality of rotatable arms disposed in said pan, and means whereby said arms may be vertically adjusted.

14. In an apparatus for concentrating latex or similar materials, a shallow latex pan, means disposed centrally thereof for radially discharging a heated gas adjacent the surface of the latex, a plurality of rotatable arms disposed in the pan, and means whereby said arms may be maintained in contact with the surface of the latex.

15. In an apparatus for concentrating latex or similar materials, a shallow latex pan, means for heating the same, means for centrally and horizontally discharging a heated gas within the pan, means for continuously agitating the surface of the latex, and means for adjusting said last means in accordance with variations in the level of the latex.

Signed at New York, county of New York, and State of New York, this 2d day of July, 1923.

WILLIS A. GIBBONS.

Signed at New York, county of New York, and State of New York, this 2d day of July, 1923.

MORRIS G. SHEPARD.